United States Patent
Ishikawa

(10) Patent No.: US 9,152,018 B2
(45) Date of Patent: Oct. 6, 2015

(54) IMAGE PICKUP LENS, IMAGE PICKUP APPARATUS, AND CONTROL METHOD OF THE IMAGE PICKUP APPARATUS

(75) Inventor: Daisuke Ishikawa, Yamato (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 326 days.

(21) Appl. No.: 13/014,461

(22) Filed: Jan. 26, 2011

(65) Prior Publication Data

US 2011/0194189 A1 Aug. 11, 2011

(30) Foreign Application Priority Data

Feb. 5, 2010 (JP) ................................ 2010-023923

(51) Int. Cl.
*G02B 15/02* (2006.01)
*G03B 17/12* (2006.01)
*G02B 7/10* (2006.01)

(52) U.S. Cl.
CPC ............... *G03B 17/12* (2013.01); *G02B 7/102* (2013.01)

(58) Field of Classification Search
CPC ............................... G02B 7/102; G03B 17/12
USPC ......... 359/642, 672–673, 676, 683–684, 698; 396/134
See application file for complete search history.

(56) References Cited

U.S. PATENT DOCUMENTS

| 6,744,468 B2 * | 6/2004 | Ohkawara et al. ............ 348/347 |
| 6,954,313 B2 | 10/2005 | Kaneda et al. |
| 7,013,082 B2 | 3/2006 | Kaneda et al. |

FOREIGN PATENT DOCUMENTS

| CN | 1256432 A | 6/2000 |
| CN | 1309322 A | 8/2001 |
| CN | 1495504 A | 5/2004 |
| CN | 102147521 A | 8/2011 |
| JP | 07-281069 A | 10/1995 |
| JP | 07-281072 | 10/1995 |
| JP | 2000-270253 A | 9/2000 |
| JP | 2004-233892 | 8/2004 |
| JP | 2005-106850 A | 4/2005 |

OTHER PUBLICATIONS

Mar. 18, 2014 Japanese Office Action that issued in Japanese Patent Application No. 2010-023923.
Dec. 24, 2013 Japanese Office Action that issued in Japanese Patent Application No. 2010-023923.

\* cited by examiner

*Primary Examiner* — James Greece
(74) *Attorney, Agent, or Firm* — Cowan, Liebowitz & Latman, P.C.

(57) ABSTRACT

An image pickup lens includes an optical system that includes a magnification variable lens used for a magnification variation, and a focus lens configured to adjust an in-focus state, a wide attachment lens being configured to change an enlargement ratio of the image pickup lens and attachable to the optical system, and a manipulator manipulated so as to instruct driving of the magnification variable lens. A moving amount of the magnification variable lens per a predetermined manipulated amount of the manipulator when the wide attachment lens is attached is smaller than that when the wide attachment lens is not attached.

15 Claims, 3 Drawing Sheets

IMAGE PICKUP LENS, IMAGE PICKUP APPARATUS, AND CONTROL METHOD OF THE IMAGE PICKUP APPARATUS

BACKGROUND OF THE INVENTION

1. Field of the Invention

The present invention relates to an image pickup lens, an image pickup apparatus, and a control method of the image pickup apparatus.

2. Description of the Related Art

Japanese Patent Laid-Open No. ("JP") 2004-233892 discloses an image pickup apparatus configured to drive a magnification variable lens using a variable magnification ring and a zoom key, and to maintain a correlation between a position of the variable magnification ring and a position of the magnification variable lens. JP 07-281072 discloses an image pickup apparatus that includes a wide attachment ("WA") lens attachable to an optical system that includes a magnification variable lens and configured to change a focal length and an enlargement ratio of the optical system (for example, so as to obtain an image having a wider angle of view).

However, for an image pickup apparatus that is made by combining these two references with each other, a cam curve that represents a position used for a focus lens to maintain an in-focus state relative to a position of the magnification variable lens when the WA lens is attached is different from that when the WA lens is not attached. The in-focusing range of the focus lens when the WA lens is attached is narrower than the in-focusing range of the focus lens when the WA lens is not attached.

More specifically, if it is assumed that the magnification variable ring has a rotatable range from 0° to θ°, the magnification variable lens has a maximum moving distance of L, and an in-focusable maximum moving distance of the magnification variable lens when the WA lens is attached is Lw (L>LW), an in-focusable angular range of the magnification variable ring becomes between 0° and (θ×Lw/L)°. Therefore, in a range between (θ×Lw/L)° and θ° on the telephoto side, although the magnification variable ring is manipulated, a good image pickup state cannot be provided because the magnification variable lens cannot be driven or the in-focus cannot be maintained.

SUMMARY OF THE INVENTION

An image pickup lens according to one aspect of the present invention includes an optical system that includes a magnification variable lens used for a magnification variation, and a focus lens configured to adjust an in-focus state, a wide attachment lens being configured to change an enlargement ratio of the image pickup lens and attachable to the optical system, and a manipulator manipulated so as to instruct driving of the magnification variable lens. A moving amount of the magnification variable lens per a predetermined manipulated amount of the manipulator when the wide attachment lens is attached is smaller than that when the wide attachment lens is not attached.

Further features of the present invention will become apparent from the following description of exemplary embodiments with reference to the attached drawings.

DESCRIPTION OF THE EMBODIMENTS

Figure 1:
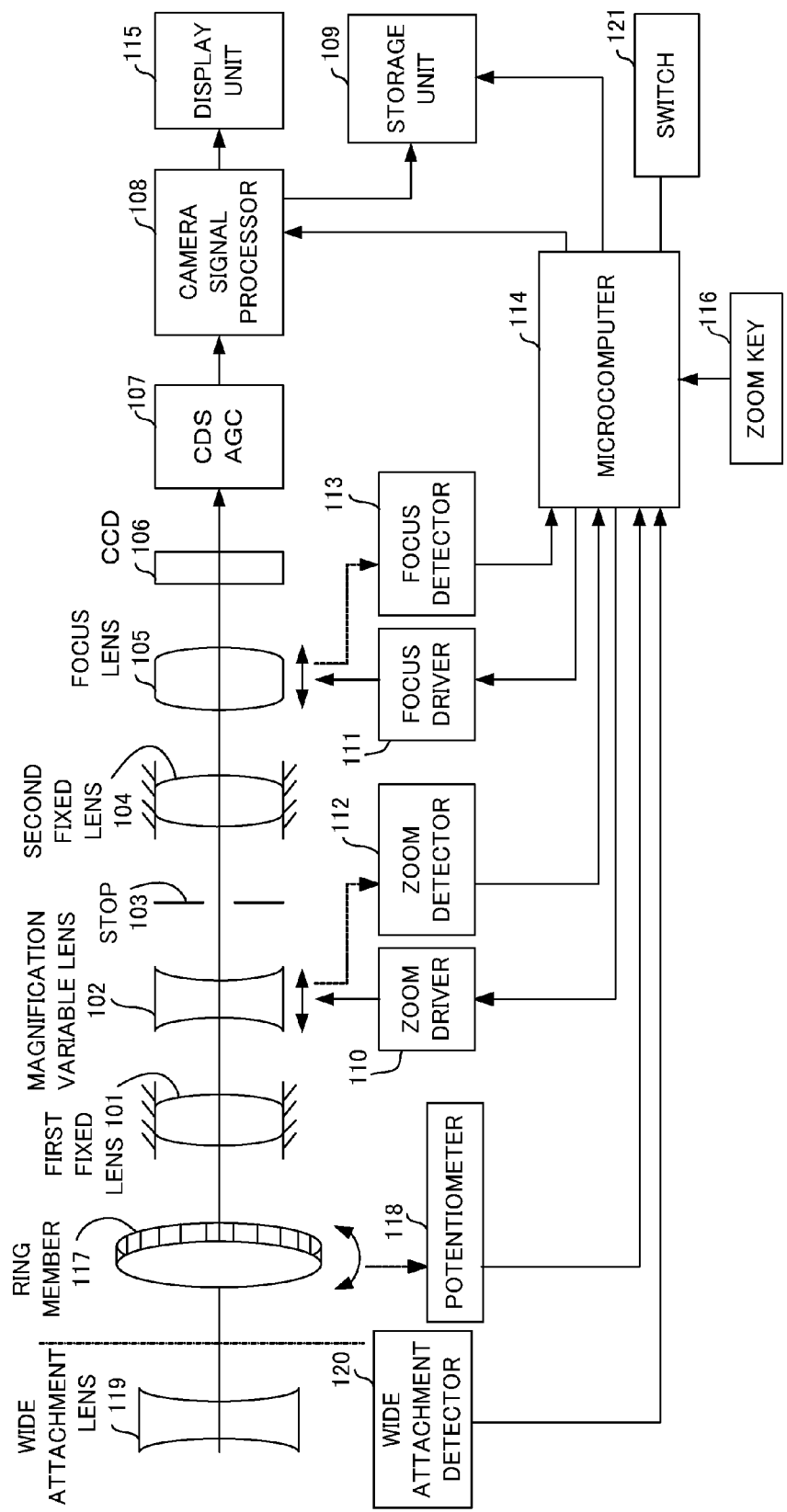
FIG. 1 is a block diagram of an image pickup apparatus according to this embodiment.

FIG. 1 is a block diagram of an image pickup apparatus of this embodiment. The image pickup apparatus is integrated with an image pickup lens, but an image pickup lens may be attached to and detached from a camera body. In that case, a magnification variable lens 102, a focus lens 105, and a ring member 117, and a wide attachment ("WA") lens 119, which will be described later, are provided to an image pickup lens, and a zoom key 116, which will be described later, is provided to the camera body. A control signal generated by a microcomputer 114, which will be described later, is sent to a lens computer in the image pickup lens configured to control the image pickup lens, and the control signal is used to control driving of the magnification variable lens in accordance with a manipulation of a ring member or a zoom key via the lens computer. This embodiment is applicable to a variety of image pickup apparatuses, such as a video camera, and a digital still camera.

In FIG. 1, reference numeral 101 denotes a first fixed lens unit, reference numeral 102 denotes a variator lens unit (which will be referred to as a "magnification variable lens (zoom lens)" hereinafter), and reference numeral 103 denotes a stop. Reference numeral 104 denotes a second fixed lens unit, reference numeral 105 denotes a focusing lens, more specifically, a lens unit which serves as a focusing function and a so-called compensation (zoom tracking) function of correcting a movement of a focal plane caused by the magnification variation (and will be referred to as a "focus lens" hereinafter).

The magnification variable lens 102 and the focus lens 105 are configured movable in the optical axis direction (or lateral direction in FIG. 1) by the zoom driver 110 and the focus driver 111, respectively. Each driver may use a stepping motor or a direct driving type voice coil motor.

The position of the magnification variable lens 102 is detected by a zoom detector 112, and the position of the focus lens 105 is detected by a focus detector 113. When the driver is a stepping motor, the detector may be a counter of an input pulse from a reset position. At this time, a photo interrupter may be used, for example, as a position sensor used to detect the reference position, and detects as the reference position a boundary position that is light-shielded by a light shield wall integrated with a movable lens frame. There is another type of position detector configured to detect a magnetic change of a magnetic scale integrated with the movable lens frame using a magneto-resistance ("MR") device etc.

The incident light from the object forms an image on an image pickup device 106 through an optical system that includes the lens units 101 to 105. The image pickup element 106 is a photoelectric conversion element, such as a CCD and a CMOS, and converts an object image into an electric signal. The electric signal is read out and amplified by a CDS/AGC circuit 107, and input into a camera signal processor 108.

The camera signal processor 108 processes an image, and converts the input signal into a signal suitable for a storage unit 109 and a display unit 115. The storage unit 109 stores an object image in a recording medium, such as a magnetic tape, an optical disk, and a semiconductor memory. The display unit 115 displays an object image on a display, such as an electronic viewfinder and a liquid crystal panel.

The microcomputer ("MC") 114 is a controller (processor) configured to control the entire image pickup apparatus, and to control the camera signal processor 108, the storage unit 109, etc. The MC 114 includes a memory (not illustrated), and stores methods illustrated in FIGS. 2 and 3, as described later, and parameters used for these methods.

Information about the position of the magnification variable lens 102 detected by the zoom detector 112 and the position of the focus lens 105 detected by the focus detector 113 are input into the MC 114 and used to control these lenses. Moreover, the MC 114 provides controls over the zoom driver 110 and the focus driver 111 and the lenses in accordance with a processing result of the lens driving control. In addition, the MC 114 controls driving of the magnification variable lens 102 in accordance with an output of the potentiometer 118, which will be described later.

The zoom key 116 is a manipulator to be manipulated in the power zooming. The zoom key 116 can include a volume key, a switch, etc., and its output is input into the MC 114. In case of the volume key, the zoom is driven by the MC 114 at a speed corresponding to the key pressure, and in case of the switch, the zoom is driven at a predetermined speed when it is turned on.

The ring member 117 is a manipulator used for a photographer to instruct a movement of the magnification variable lens 102 in the manual zooming, and rotatably provided on a fixed lens barrel (not illustrated) of the optical system of the image pickup apparatus according to this embodiment. The ring member 117 is driven by a driver (not illustrated) driving of which is controlled by the MC 114, and this driver includes a stepping motor or a DC motor. While this embodiment uses the ring member for the manipulator, a manipulation switch that cannot be rotatable may be used.

The ring member 117 of this embodiment is an absolute type electronic ring provided so that its rotating center can accord with the optical center (optical axis), and a manipulated amount by a photographer is converted into an electric signal.

In this embodiment, a value of the position of the magnification variable lens 102 becomes larger as the magnification variable lens 102 is moved closer to the telephoto end, and the MC 114 controls the magnification variable lens 102 so as to move it to the telephoto side when the ring member 117 is rotationally manipulated so that its angle becomes larger.

A rotational manipulation range of the ring member 117 is physically restricted by mechanical contacts with a telephoto end stopper located at the telephoto end at which the focal length (zoom position) has the longest-focus distance and a wide angle stopper located at the wide angle end at which the focal length has the shortest-focus distance. A rotational manipulation of the ring member 117 is available with an angle, for example, between 60° to 90°.

The ring member 117 has a focal length scale formed by printing or imprinting, and the fixed lens barrel (not illustrated) configured to rotatably support the ring member 117 has an index. The photographer can read out the current focal length of the optical system using a figure on the focal length scale corresponding to the index.

Reference numeral 118 denotes a multi-rotation type potentiometer configured to detect a position (rotating angle) of the ring member 117 and to output a position detection signal. The potentiometer 118 is associatively driven by the ring member 117 via a gearbox from an inner gear provided to the ring member 117, and outputs a signal that corresponds to (or is used to detect the position of) the position of the ring member 117.

The output of the potentiometer 118 is supplied to the A/D converter input unit of the MC 114. Output values of the potentiometer 118 at the wide angle end stopper position and at the telephoto end stopper position have been previously measured and respectively stored as Pw and Pt in the memory (not illustrated) in the MC 114.

The following expression is established among the current position P of the ring member 117, the maximum distance (stroke) L of the magnification variable lens 102, the position Z of the magnification variable lens 102 corresponding to the potentiometer 118, the wide angle side stopper position Pw, and the telephoto side stopper position Pt: The MC 114 previously stores Expression 1 and L in the memory (not illustrated):

$$Z=L\times(P-Pw)/(Pt-Pw) \quad \text{Expression 1}$$

When the photographer rotates the ring member 117 in the manual zooming, the potentiometer 118 detects the position of the ring member 117 and sends this detection result to the MC 114. Utilizing the detection result of the potentiometer 118 and the detection result of the zoom detector 112, the MC 114 drives the zoom driver 110 so as to move the magnification variable lens 102 to a position instructed by the ring member 117 which is used to form a new focal length.

In addition, for zoom tracking, the MC 114 utilizes the cam locus information stored in the memory (not illustrated) and the information from the focus detector 113, and drives the focus driver 111 so as to move the focus lens 105 to a position at which the focus lens 105 can maintain the in-focus state. Thereby, the optical system is set to a zoom position corresponding to the position of the ring member 117.

On the other hand, when the photographer manipulates the zoom key 116 in the power zooming, the MC 114 drives the zoom driver 110 in accordance with the manipulation of the zoom key 116. The position of the ring member 117 driven by the zoom driver 110 is also detected by the potentiometer 118. Thereafter, the zoom tracking follows, as described above.

Thus, whether the ring member 117 or the zoom key 116 is manipulated, the magnification variation (zooming) is available. The MC 114 validates the ring member 117 or the zoom key 116 through a manipulation of the switch 121. In order to validate the manipulation of the ring member 117, a validation/invalidation switch of the ring member 117 or a zoom/focus switch may be used.

Reference numeral 119 denotes a wide attachment ("WA") lens that can be detached and attached so as to change a focal length of the lens unit or the enlargement ratio. The wide attachment detector 120 detects whether or not the WA lens 119 is attached.

The wide attachment detector 120 includes a switch that is configured to turn on when the WA lens 119 is attached, and the MC 114 can read its output (detection result). In addition, the wide attachment detector 120 may be implemented as a manipulator (not illustrated) in a menu screen using a character generator that superimposes a character on the display unit.

Figure 2:
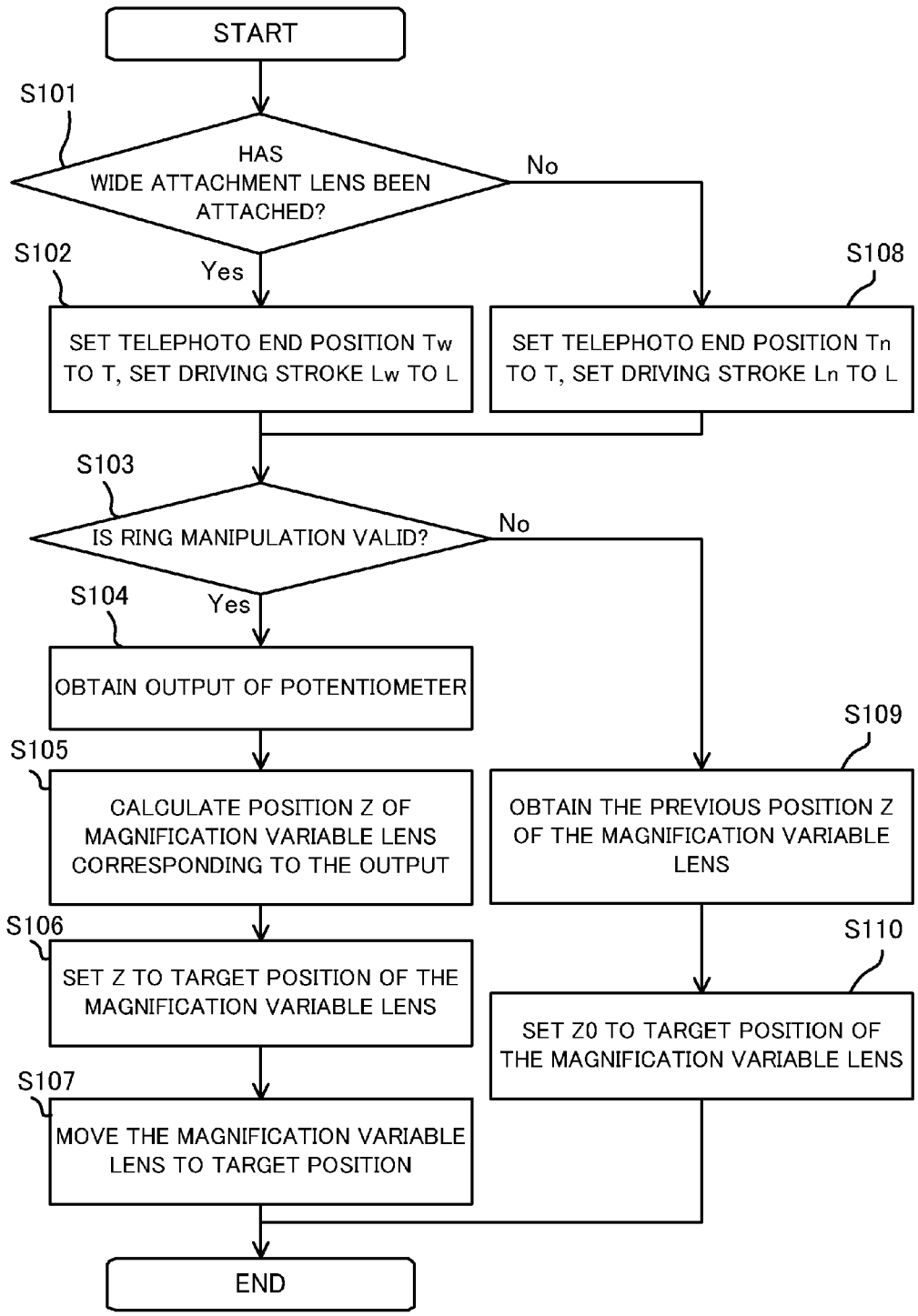
FIG. 2 is a flowchart for explaining a control method of the image pickup apparatus executed by a microcomputer illustrated in FIG. 1.

FIG. 2 is a flowchart for explaining a control method of the image pickup apparatus using the MC 114 in setting the initial position when the camera is run. This is a process to match the position of the ring member 117 with the position of the magnification variation lens 102 when the ring member 117 is rotated while the camera switch is being turned off. In FIG. 2, "S" stands for the "step."

Initially, the MC 114 determines whether or not the WA lens 119 is attached, based on an output of the wide attachment detector 120 (S101).

When determining that the WA lens 119 is attached (Yes of S101), the MC 114 sets the telephoto end position Tw of the magnification variable lens 102 to the telephoto end position T, and the maximum moving distance (driving stroke) Lw of the magnification variable lens 102 to L (S102). In this embodiment, Tw and Lw corresponds to a positions that can maintain the in-focus state of the focus lens 105 when the WA lens 119 is attached and corresponds to the maximum angle (θ×Lw/L)° on the telephoto side of the ring member described in the prior art. As long as the in-focus state can be maintained, this embodiment allows Tw and Lw to have more or less smaller values.

On the other hand, when determining that the WA lens 119 is not attached (No of S101), the MC 114 sets a usual telephoto end position Tn of the magnification variable lens 102 to the telephoto end position T, and a usual maximum moving distance (driving stroke) Ln of the magnification variable lens 102 to L (S108). In this embodiment, Tn and Ln corresponds to a position corresponding to the maximum angle θ° of the ring member on the telephoto end described in the prior art. Here, Tw<Tn is satisfied and Lw<Ln is satisfied.

Due to S102 and S108, the MC 114 sets the driving range and the driving stroke of the magnification variable lens 102 when the WA lens 119 is not attached, to be larger than those when the WA lens 119 is attached, so that the focus lens 105 can maintain the in-focus range. The MC 114 changes the allocated stroke of the ring member 117 when the WA lens 119 is attached. In other words, the moving amount of the magnification lens 102 per the predetermined manipulated amount of the ring member 117 when the WA lens 119 is attached is set to be smaller than that when the WA lens 119 is not attached.

After S102 or S108, the MC 114 determines whether the manipulation of the ring member 117 is valid (S103).

When determining that the manipulation of the ring member 117 is valid (Yes of S103), the MC 114 obtains an output of the potentiometer 118 (S104), calculates the position Z of the magnification variable lens 102 based on the current position P of the ring member 117 and Expression 1, and sets Z to Z0 (S105). Next, the MC 114 sets Z0 to the target position (S106), and drives the magnification variable lens 102 to the target position (S107).

On the other hand, when determining that the manipulation of the ring member 117 is invalid (No of S103), the MC 114 obtains the (backup) position Z0 of the magnification variable lens 102 when the camera is turned off last time (S109), and sets it to the target position (S110). The MC 114 stores the position in the memory (not illustrated) when the camera is turned off last time.

Figure 3:
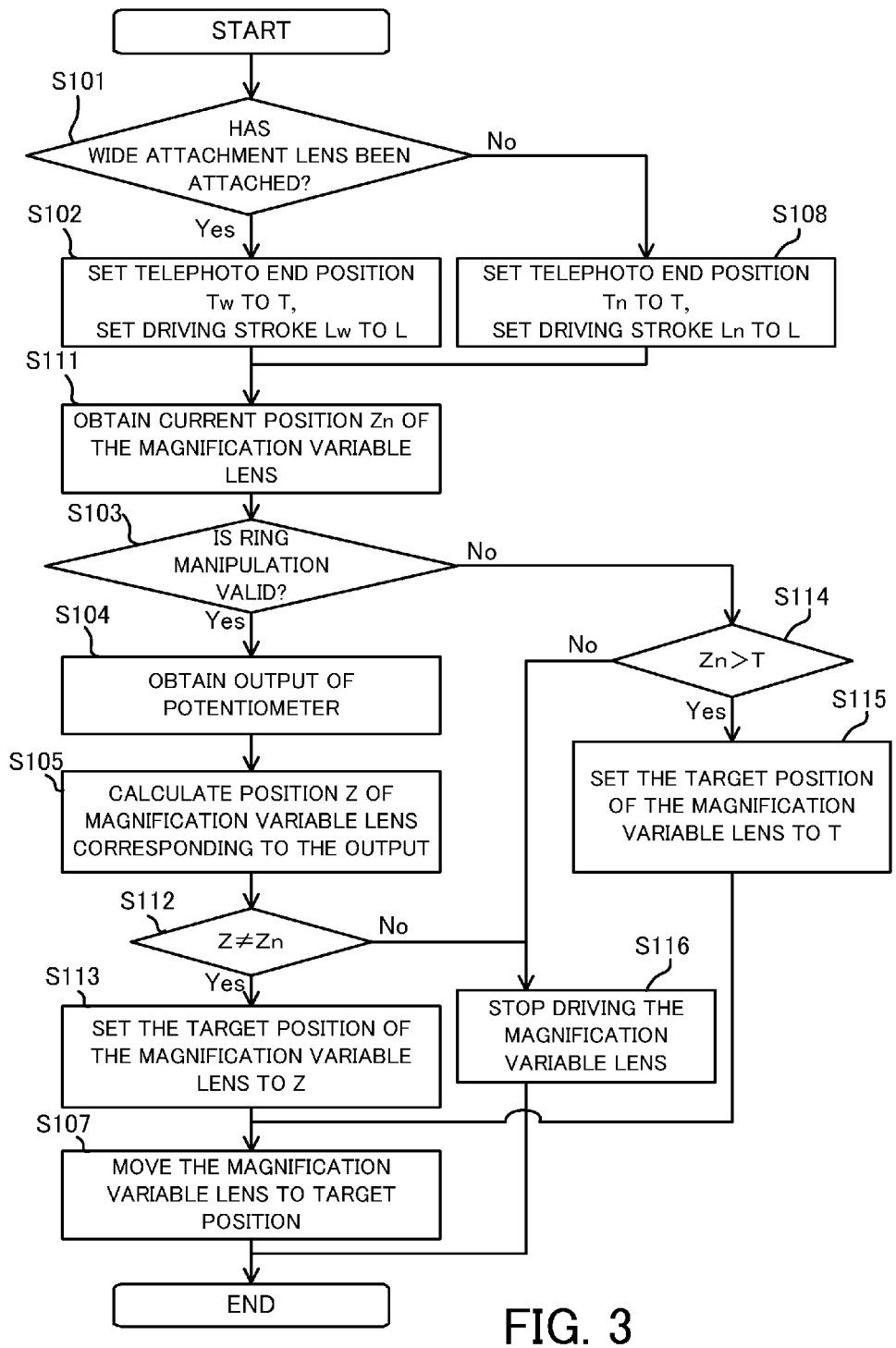
FIG. 3 is a flowchart for explaining another control method of the image pickup apparatus executed by the microcomputer illustrated in FIG. 1.

FIG. 3 is a flowchart for explaining another control method of the image pickup apparatus which is executed by the MC 114. In FIG. 3, "S" stands for the "step," and those steps, which are same or corresponding steps in FIG. 2, are designated by the same reference numerals.

Initially, S101, S102, and S108 are performed similar to FIG. 2. Thereby, the MC 114 sets the driving range and the driving stroke of the magnification variable lens 102 when the WA lens 119 is not attached, to be larger than the driving range and the driving stroke of the magnification variable lens 102 when the WA lens 119 is attached, so that the focus lens 105 can maintain the in-focus state. The MC 114 changes the allocated stroke of the ring member 117 when the WA lens 119 is attached. In other words, the moving amount of the magnification variable lens 102 per the predetermined manipulated amount of the ring member 117 when the WA lens 119 is attached is set to be smaller than that when the WA lens 119 is not attached. Thus, the MC 114 switches the mode between the attachment mode of the WA lens 119 and the non-attachment mode of the WA lens 119.

After S102 or S108, the MC 114 obtains the current zoom position Zn using the zoom detector 112 (S111).

Next, when determining that the manipulation of the ring member 117 is valid (Yes of S103), S104 and S105 follow. Thereafter, the MC 114 determines whether the position Z of the magnification variable lens 102 corresponding to the potentiometer 118 accords with the current position Zn of the magnification variable lens 102 obtained by the zoom detector 112 (S112).

Next, when determining that Z does not accord with Zn (Yes of S112), the MC 114 sets the target position of the magnification variable lens 102 to Z (S113) and performs S107. On the other hand, when determining that Z accords with Zn (No of S112), the MC 114 stops driving the magnification variable lens 102 since the magnification variable lens 102 is located at the target position.

On the other hand, when determining that the manipulation of the ring member 117 is invalid (No of S103), the MC 114 determines whether Zn obtained in S111 is larger than the telephoto end position T (or closer to the telephoto side) (S114). When determining that Zn>T is established (Yes of S114), the MC 114 sets the target position of the magnification variable lens 102 to T (S115) and performs S107. This configuration can prevent the magnification variable lens 102 from moving to the telephoto end side beyond the in-focus range.

On the other hand, when determining that Zn≤T is established (No of S114), the MC 114 stops driving of the magnification lens 102 so as to wait the input of the zoom key 116 (S116).

This embodiment can provide a good image pickup state in the zooming and manual focusing using the ring member 117 when the WA lens 119 is attached to the optical system. More specifically, this embodiment can realize a manipulating sense close to that of a lens in a mechanical cam mechanism, and prevent a malfunction caused by a breakdown of a correlation between the absolute position of the lens and the ring angle.

Further, this embodiment may maintain the photographer's manipulating sense before and after the attachment/detachment of the WA lens 119 (or before and after the state transfers), when the attachment state of the WA lens 119 is transferred to the detachment state or when the detachment state of the WA lens 119 is transferred to the attachment state.

Hence, the MC 114 calculates Zn/Lw that is a ratio of the current position Zn of the magnification variable lens 102 to the driving stoke Lw of the magnification variable lens 102 when the WA lens 119 is attached. The MC 114 also calculates Zn/Ln that is a ratio of the current position Zn of the magnification variable lens 102 to the driving stoke Ln of the magnification variable lens 102 when the WA lens 119 is not attached. The MC 114 controls, through the zoom driver 110, the position of the magnification variable lens 102 of the post-attachment/post-detachment of the WA lens 119 (or the post-transfer state) so as to maintain the ratio of the pre-attachment/pre-detachment of the WA lens 119 (or the pre-transfer state).

Moreover, the MC 114 in this embodiment calculates a ratio of the current position P of the ring member 117 obtained from the detection result from the potentiometer 118, relative to the manipulation range. Then, when the manipulation of the ring member 117 is changed from the invalidity to the validity, the MC 114 controls the zoom driver 110 so as to move the magnification variable lens 102 to a position corresponding to a value made by internally dividing the driving stroke L of the magnification variable lens 102 by that ratio. On the other hand, the MC 114 does not drive the magnification variable lens 102 when the manipulation of the ring member 117 is changed from the validity to the invalidity. This configuration can improve the operability of the photographer.

The flowcharts illustrated in FIGS. 2 and 3 can be implemented as a program executed by a processor (computer).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-023923, filed Feb. 5, 2010, which is hereby incorporated by reference herein in its entirety.

What is claimed is:

1. An image pickup lens comprising:
   an optical system that includes a magnification variable lens used for a magnification variation, and a focus lens configured to adjust an in-focus state, wherein the optical system is capable of attaching a wide attachment lens being configured to change an enlargement ratio of the optical system; and
   a manipulator manipulated so as to instruct driving of the magnification variable lens,
   wherein a range capable of driving the magnification variable lens when the wide attachment lens is attached is restricted to be smaller than that when the wide attachment lens is not attached, and
   a moving amount of the magnification variable lens per a predetermined manipulated amount of the manipulator when the wide attachment lens is attached is restricted to be a smaller distance than that when the wide attachment lens is not attached.

2. The image pickup lens according to claim 1, further comprising:
   a first detector configured to detect whether or not the wide attachment lens is attached to the optical system; and
   a controller configured to set the range capable of driving the magnification variable lens and the moving amount of the magnification variable lens per the predetermined manipulated amount based on a detection result of the first detector.

3. The image pickup lens according to claim 2, further comprising:
   a second detector configured to detect a position of the magnification variable lens; and
   a driver configured to drive the magnification variable lens,
   wherein the controller drives the position of the magnification variable lens via the driver so that a ratio of the position of the magnification variable lens obtained from a detection result of the second detector to a driving range of the magnification variable lens can be maintained before and after the wide attachment lens is attached or detached.

4. The image pickup lens according to claim 2, further comprising:
   a switch configured to switch a manipulation of the manipulator between validity and invalidity;
   a second detector configured to detect a position of the manipulator; and
   a driver configured to drive the magnification variable lens,
   wherein when the switch switches the manipulation of the manipulator from the invalidity to the validity, the controller controls the driver so as to move the magnification variable lens to a position that corresponds to a value made by internally dividing a maximum moving distance of the magnification variable lens by a ratio between the position of the manipulator obtained from a detection result of the second detector to a manipulation range of the manipulator.

5. The image pickup lens according to claim 4, wherein the controller controls the driver so as not to drive the magnification variable lens when the switch switches the manipulation of the manipulator from the validity to the invalidity.

6. The image pickup lens according to claim 2, further comprising:
   a switch configured to switch a manipulation of the manipulator between validity and invalidity;
   a second detector configured to detect a position of the magnification variable lens; and
   a driver configured to drive the magnification variable lens,
   wherein when the switch switches the manipulation of the manipulator from the validity to the invalidity and a current position of the magnification variable lens obtained from the second detector is closer to a telephoto end beyond a position at which the in-focus state can be maintained, the controller controls the driver so as to move the magnification variable lens to the position at which the in-focus state of the magnification variable lens can be maintained on a telephoto side.

7. An image pickup apparatus comprising an image pickup lens according to claim 1.

8. A control method of an image pickup apparatus that includes an optical system that includes a magnification variable lens used for a magnification variation, and a focus lens configured to adjust an in-focus state, the optical system capable of attaching a wide attachment lens being configured to change an enlargement ratio of the optical system, and a manipulator manipulated so as to instruct driving of the magnification variable lens, the control method comprising:
   obtaining a signal indicative of whether or not the wide attachment lens is attached to the optical system; and
   restricting a range capable of driving the magnification variable lens when the wide attachment lens is attached and a moving amount of the magnification variable lens per a predetermined manipulated amount of the manipulator when the wide attachment lens is attached, to be a smaller distance than those when the wide attachment lens is not attached.

9. An image pickup apparatus comprising:
   an optical system that includes a magnification variable lens used for a magnification variation, and a focus lens configured to adjust an in-focus state, wherein the optical system is capable of attaching a wide attachment lens configured to change an enlargement ratio of the optical system; and
   a manipulator manipulated so as to instruct driving of the magnification variable lens,
   wherein a moving amount of the magnification variable lens per a predetermined manipulated amount of the manipulator in case the wide attachment lens is attached is restricted to be a smaller distance than that in case the wide attachment lens is not attached.

10. The image pickup apparatus according to claim 9, further comprising:
    a first detector configured to detect whether or not the wide attachment lens is attached to the optical system; and a controller configured to set the moving amount of the magnification variable lens per the predetermined manipulated amount based on a detection result of the first detector.

11. The image pickup apparatus according to claim 10, further comprising:
a second detector configured to detect a position of the magnification variable lens; and
a driver configured to drive the magnification variable lens,
wherein the controller drives the position of the magnification variable lens via the driver so that a ratio of the position of the magnification variable lens obtained from a detection result of the second detector to a driving range of the magnification variable lens can be maintained before and after the wide attachment lens is attached or detached.

12. The image pickup apparatus according to claim 10, further comprising:
a switch configured to switch a manipulation of the manipulator between validity and invalidity;
a third detector configured to detect a position of the manipulator; and
a driver configured to drive the magnification variable lens,
wherein when the switch switches the manipulation of the manipulator from the invalidity to the validity, the controller controls the driver so as to move the magnification variable lens to a position that corresponds to a value made by internally dividing a maximum moving distance of the magnification variable lens by a ratio between the position of the manipulator obtained from a detection result of the third detector to a manipulation range of the manipulator.

13. The image pickup apparatus according to claim 12, wherein the controller controls the driver so as not to drive the magnification variable lens when the switch switches the manipulation of the manipulator from the validity to the invalidity.

14. The image pickup apparatus according to claim 10, further comprising:
a switch configured to switch a manipulation of the manipulator between validity and invalidity;
a second detector configured to detect a position of the magnification variable lens; and
a driver configured to drive the magnification variable lens,
wherein when the switch switches the manipulation of the manipulator from the validity to the invalidity and a current position of the magnification variable lens obtained from the second detector is closer to a telephoto end beyond a position at which the in-focus state can be maintained, the controller controls the driver so as to move the magnification variable lens to the position at which the in-focus state of the magnification variable lens can be maintained on a telephoto side.

15. A control method of an image pickup apparatus that includes
an optical system that includes a magnification variable lens used for a magnification variation, and a focus lens configured to adjust an in-focus state, the optical system capable of attaching a wide attachment lens configured to change an enlargement ratio of the optical system, and
a manipulator manipulated so as to instruct driving of the magnification variable lens,
the control method comprising:
obtaining a signal indicative of whether or not the wide attachment lens is attached to the optical system; and
restricting a moving amount of the magnification variable lens per a predetermined manipulated amount of the manipulator in case the wide attachment lens is attached, to be a smaller distance than that in case the wide attachment lens is not attached.

* * * * *